US012089775B2

(12) United States Patent
Benes et al.

(10) Patent No.: US 12,089,775 B2
(45) Date of Patent: Sep. 17, 2024

(54) BEVERAGE MACHINE WITH AN ACTUATION DISTRIBUTION

(71) Applicant: SOCIETE DES PRODUITS NESTLE S.A., Vevey (CH)

(72) Inventors: Harald Benes, Traiskirchen (AT); Gottfried Hack, Neulengbach (AT); Felix Olbert, Vienna (AT)

(73) Assignee: Societe des Produits Nestle S.A., Vevey (CH)

( * ) Notice: Subject to any disclaimer, the term of this patent is extended or adjusted under 35 U.S.C. 154(b) by 755 days.

(21) Appl. No.: 17/280,299

(22) PCT Filed: Sep. 27, 2019

(86) PCT No.: PCT/EP2019/076139
§ 371 (c)(1),
(2) Date: Mar. 26, 2021

(87) PCT Pub. No.: WO2020/064984
PCT Pub. Date: Apr. 2, 2020

(65) Prior Publication Data
US 2022/0031109 A1 Feb. 3, 2022

(30) Foreign Application Priority Data
Sep. 27, 2018 (EP) .................................. 18197101

(51) Int. Cl.
*A47J 31/36* (2006.01)
*A47J 31/40* (2006.01)
(Continued)

(52) U.S. Cl.
CPC ......... *A47J 31/3633* (2013.01); *A47J 31/407* (2013.01); *A47J 31/4403* (2013.01); *A47J 31/468* (2018.08)

(58) Field of Classification Search
CPC .. A47J 31/468; A47J 31/3633; A47J 31/4403; A47J 31/407
See application file for complete search history.

(56) References Cited

U.S. PATENT DOCUMENTS

| 2011/0162530 A1* | 7/2011 | Castellani | ........... A47J 31/3638 |
| | | | 99/279 |
| 2012/0048121 A1* | 3/2012 | Krug | .................... A47J 31/3633 |
| | | | 99/290 |

(Continued)

FOREIGN PATENT DOCUMENTS

| CN | 103298383 A | 9/2013 |
| CN | 104135901 A | 11/2014 |

(Continued)

OTHER PUBLICATIONS

Japanese Office Action for Appl No. JP2021-516491 dated May 30, 2023.

(Continued)

*Primary Examiner* — Thien S Tran
(74) *Attorney, Agent, or Firm* — K&L Gates LLP

(57) ABSTRACT

A machine (1) for preparing and dispensing a beverage has an actuation arrangement (5) that includes an actuator (57) and an actuation transmission (50,510,520,530) actuated by the actuator (57). The actuation transmission (50,510,520,530) has an actuation distributor (50) actuated by the actuator (57) and a first actuation output device (510) having a first input port (511) and a second actuation output device (520) having a second input port (521). The actuation distributor (50) has a first output port (50') for operating the first actuation output device (510) via the first input port (511) and a second output port (50") for operating the second actuation output device (520) via the second input port (521). The first actuation output device (510) and the second (Continued)

actuation output device (520) are displaced in a non-identical manner via the first and second output ports (50',50").

18 Claims, 6 Drawing Sheets

(51) Int. Cl.
*A47J 31/44* (2006.01)
*A47J 31/46* (2006.01)

(56) References Cited

U.S. PATENT DOCUMENTS

| | | | | |
|---|---|---|---|---|
| 2014/0338542 A1* | 11/2014 | Smith | ............ | A47J 31/407 |
| | | | | 99/295 |
| 2015/0257580 A1* | 9/2015 | Crarer | ............ | A47J 31/3638 |
| | | | | 99/295 |
| 2017/0215625 A1 | 8/2017 | Fontbonne | | |

FOREIGN PATENT DOCUMENTS

| | | |
|---|---|---|
| CN | 107920684 A | 4/2018 |
| DE | 20116779 | 1/2002 |
| DE | 102010037189 | 3/2011 |
| JP | 2010535575 A | 11/2010 |
| RU | 2485878 C2 | 6/2013 |
| RU | 2562783 C2 | 9/2015 |
| WO | 2017001644 A1 | 1/2017 |
| WO | 2017037215 A1 | 3/2017 |

OTHER PUBLICATIONS

Chinese Office Action for Appl No. 201980058073.7 dated Aug. 31, 2022.
Russian Office Action for Russial Appl No. 2021111016/03 dated Jan. 19, 2020.
Russian Office Action for Appl No. 2021111016/03 dated Jan. 19, 2023.

* cited by examiner

… … US 12,089,775 B2

BEVERAGE MACHINE WITH AN ACTUATION DISTRIBUTION

CROSS REFERENCE TO RELATED APPLICATIONS

The present application is a National Stage of International Application No. PCT/EP2019/076139, filed on Sep. 27, 2019, which claims priority to European Patent Application No. 18197101.1, filed on Sep. 27, 2018, the entire contents of which are being incorporated herein by reference.

FIELD OF THE INVENTION

The field of the invention pertains to beverage preparation machines provided with an actuation of different machine parts, e.g. machines using capsules of an ingredient of the beverage to be prepared.

For the purpose of the present description, a "beverage" is meant to include any human-consumable liquid substance, such as tea, coffee, hot or cold chocolate, milk, soup, baby food, etc. . . . . A "capsule" is meant to include any pre-portioned beverage ingredient, such as a flavoring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage portion or a plurality of beverage portions.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device holds the capsule, water is injected into the capsule, the beverage is produced in the capsule and a brewed beverage can be drained from the capsule and collected in a receptacle, e.g. a cup or mug.

Brewing devices have been developed to facilitate insertion of a "fresh" capsule and removal of the capsule upon use. Typically, the brewing devices comprise two parts relatively movable from a configuration for inserting/removing a capsule to a configuration for brewing the ingredient in the capsule.

The actuation of the movable part of the brewing device may be manual as disclosed in WO 2009/043630, WO 01/15581, WO 02/43541, WO 2010/015427, WO 2010/128109, WO 2011/144719 and WO 2012/032019. Various handle configurations are disclosed in EP 1867260, WO 2005/004683, WO WO2007/135136, WO 2008/138710, WO 2009/074550, WO 2009/074553, WO 2009/074555, WO 2009/074557, WO 2009/074559, WO 2010/037806, WO 2011/042400, WO 2011/042401 and WO 2011/144720. Integrations of such arrangements into beverage machines are disclosed in WO 2009/074550, WO2011/144719, WO 2016/083484, WO 2016/083485 and WO 2016/083488.

The actuation of the movable part of the brewing device may be motorized. Such a system is for example disclosed in EP 1 767 129. In this case, the user does not have to provide any manual effort to open or close the brewing device. Alternative configurations for a capsule insertion are disclosed WO 2012/093107 and WO 2013/127906. Different motorization systems are disclosed in WO 2012/025258, WO 2012/025259 and WO 2013/127476.

Another example of integration of a brewing device is disclosed in WO 2017/037212.

The system may also be configured for processing capsules of different sizes, for example as disclosed in WO 2014/056810, WO 2014/056821, WO 2014/056862, WO 2014/060370, WO 2014/096120, WO 2014/096121, WO 2015/022342, WO 2015/022344, WO 2015/022345, WO 2015/082662, WO 2015/082663, WO 2015/082664, WO 2015/086371, WO 2015/155144 and WO 2015/155145.

For allowing the user to interact with such machines, for providing operation instructions to the machine or obtaining feed-back therefrom, various systems have been disclosed in the art, for instance as mentioned in the following references: AT 410 377, CH 682 798, DE 44 29 353, DE 202 00 419, DE 20 2006 019 039, DE 2007 008 590, EP 1 448 084, EP 1 676 509, EP 08155851.2, FR 2 624 844, GB 2 397 510, U.S. Pat. Nos. 4,377,049, 4,458,735, 4,554,419, 4,767,632, 4,954,697, 5,312,020, 5,335,705, 5,372,061, 5,375,508, 5,645,230, 5,685,435, 5,731,981, 5,836,236, 5,959,869, 6,182,555, 6,354,341, 6,759,072, US 2007/0157820, WO 97/25634, WO99/50172, WO 2004/030435, WO 2004/030438, WO 2006/063645, WO 2006/090183, WO 2007/003062, WO 2007/003990, WO 2008/104751, WO 2008/138710, WO 2008/138820, WO 2010/003932, WO 2011/144720 and WO 2012/032019 and WO 2017/037215.

As apparent from the above prior art, beverage machines integrate various functions including ingredient management functions, beverage processing functions, beverage dispensing functions, interface functions which involve different machine parts that have to be actuated at different points in time.

SUMMARY OF THE INVENTION

It is a preferred objet of the present invention to address the integration and coordination of different functions of beverage preparation machines that need actuation at different points in time.

The invention relates to a machine for preparing a beverage. The beverage preparation machine can be an in-home or out of home machine. The machine may be for the preparation of coffee, tea, chocolate, cacao, milk, soup, baby food, etc. . . . .

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluent liquid, e.g. water, may be mixed with such ingredient to form the beverage.

Typically, a predetermined amount of beverage is formed and dispensed on user-request, which corresponds to a portion (e.g. a serving). The volume of such portion may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. . . . . In particular, a coffee machine may be configured for dispensing espressos, e.g. an adjustable volume of 20 to 60 ml per portion, and/or for dispensing lungos, e.g. a volume in the range of 70 to 150 ml per portion.

The machine of the invention is configured for preparing along a beverage processing line and dispensing therefrom a beverage.

The beverage may be prepared from a capsule containing an ingredient of the beverage. The capsule can be of the type described above under the title "Field of the Invention" and/or the capsule may include an ingredient described under the same title.

The capsule can comprise a capsule body, e.g. a generally straight or tapered body. The capsule can have a circular peripheral annulus flange, e.g. a flexible or rigid flange, extending from a peripheral part, e.g. an edge or face, of the capsule body. The capsule may contain a flavoring ingredient for preparing tea, coffee, hot chocolate, cold chocolate, milk, soup or baby food.

The machine comprises an actuation arrangement having an actuator, such as a motor e.g. an electric motor, and an actuation transmission actuated by the actuator.

The actuation transmission comprises an actuation distributor actuated by the actuator and a first actuation output device having a first input port and a second actuation output device having a second input port. The actuation distributor has a first output port for operating the first actuation output device via the first input port connected to the first output port and a second output port for operating the second actuation output device via the second input port connected to the second output port, such that the first actuation output device and the second actuation output device are displaced in a non-identical manner via the first and second output ports.

The actuation distributor may have a third output port for operating a third actuation output device having a third input port connected to the third output port such that the third actuation output device is displaced via the third input port in a manner that is non-identical to a displacement of the first actuation output device and non-identical to a displacement of the second actuation output device.

Hence, a single actuator can be used to displace different actuation output device that can move in different manners and at different points in time whereby different machine parts driven by the different actuation output device can be operated when needed to be displaced in an appropriate manner.

The distributor can be configured so that, when the actuator drives the actuation distributor, at least one of the actuation output device is stationary during a driving passive period and is displaced during a driving active period by the corresponding output port of the actuation distributor.

The first actuation output device can be associated with first driving passive and active periods and the second actuation output device can be associated with second driving passive and active periods and, when present, the third actuation output device can be associated with third driving passive and active periods. In such a case, the first driving passive and active periods can be non-identical to the second driving passive and active periods and, when present, the third driving passive and active periods can be non-identical to the first driving passive and active periods and non-identical to the second driving passive and active periods.

At least one output port and corresponding input port may be configured as a cam follower and cam arrangement or as a gear arrangement, such as a toothed gear. Such toothed gear arrangement may have gears with a partly toothed transmission track for an engagement portion (forming a displacement transmission portion constituting thus an active portion analogous to the active portion discussed below) on part of the transmission track and for a disengagement portion (forming an absence of displacement transmission portion exhibiting thus a passive portion analogous to the passive portion discussed below) on another part of the transmission track between the corresponding output and input ports.

At least one output port may form a cam and at least one input port may form a cam-follower, or vice versa.

At least one output port and corresponding input port can have a cam follower and cam arrangement with a cam having a passive portion extending along a movement direction of the cam and an active portion extending along a direction that diverges from the movement direction of the cam. For instance, the passive portion extends along a direction that is concentric with a curved movement of the cam or the passive portion extends along a direction that is parallel to a straight movement of the cam.

Hence, a movement transmission between the output port and the input port can be caused along the active portion and avoided along the passive portion.

At least one output port can have an active portion that has a first extremity and a second extremity, the first and second extremities joining a passive portion at spaced apart locations of the passive portion. For instance, the active portion and the passive portion are configured such that the input port is forced from the passive portion into the active portion at the first extremity and forced to remain on the passive portion to bypass the active portion at the second extremity.

The active portion can be relatively bypassed when the input port relatively moves along the passive portion at the first extremity, the input port entering the active portion at the second extremity.

The active portion can be relatively bypassed when the input port relatively moves along the passive portion at the second extremity, the input port entering the active portion at the first extremity.

Hence, an actuation output device can be moved (e.g. back and forth) when the actuation distributor is driven in one direction and maintained in position when the actuation distributor is driven in the opposite direction.

The active portion and the passive portion may have one or more of the following configurations to direct the input port relatively to the active portion and to the passive portion:
  the active portion forms a ramp between the first and second extremities;
  the active portion delimits a step at the first and/or second extremity or between the first and the second extremities;
  the passive portion delimits a step at the first and/or the second extremity or between the first and the second extremities; and
  the passive portion forms a ramp between the first and second extremities.

At least one input port can be biased against the corresponding output port. For instance at least one of the actuation output device comprises a connection member movably connected to the corresponding input port that is urged against the corresponding output port, e.g. by a spring or resilient part between the input port and the connection member.

The actuation distributor can be moved in rotation by the actuator about a distributor axis and/or can be linearly moved along a straight direction. For instance, the actuation distributor can be moved initially in rotation and then along a straight direction and optionally along a final curved direction.

At least one actuation output device may be connected, e.g. via a fixed connection or an articulated connection such as a pivoting and/or translating and/or a cam connection, directly or indirectly, e.g. indirectly by an articulated link having an output connector such as a pivoting and/or translating and/or a cam connector, to a rotatable and/or translatable device so as to displace the rotatable and/or translatable device relatively to a stationary main machine housing and/or stationary main machine frame by displacing the corresponding actuation device when operated by the actuation distributor. For instance, each output device is connected directly or indirectly to a corresponding rotatable and/or translatable device and each rotatable and/or translatable device is displaced relatively to a stationary main machine housing and/or stationary main machine frame by displacing its corresponding actuation device when operated by the actuation distributor.

The rotatable and/or translatable device can be a beverage dispensing head. The head may delimit a beverage passage which is displaceable by the head's output device, e.g. via a fixed connection or an articulated connection such as a pivoting and/or translating and/or a cam connection, over a dispensing area. Such dispensing area may be delimited by a support for supporting a user-recipient, e.g. a cup or mug. The beverage dispensing head can be displaceable, for instance in translation, outwards out of the stationary main machine housing and/or stationary main machine frame for dispensing a beverage and can be displaceable inwards into the stationary main machine housing and/or stationary main machine frame for resting.

Examples of rotatable and/or translatable beverage dispensing heads are disclosed in WO 2009/043630, WO 2017/037212, WO 2017/037215, PCT/EP18/064138 and PCT/EP18/064141.

The rotatable and/or translatable device can be a drop stop, such as a drop stop forming a guide for guiding beverage from the beverage processing line to a or the above dispensing area. This area can be delimited by a support for supporting a user-recipient, e.g. a cup or mug. The drop stop can be arranged for guiding liquid residues to a waste collector. The drop stop may be displaceable by its corresponding actuation output device, e.g. via a fixed connection or an articulated connection such as a pivoting and/or translating and/or a cam connection and/or via an articulated link having a connector such as a pivoting and/or translating and/or a cam connector, for instance in translation and rotation, relative to the stationary main machine housing and/or stationary main machine frame between a position for dispensing the beverage to the dispensing area and a position for preventing the dispensing of such beverage to the dispensing area.

The drop stop (e.g. guide) may have an inlet or reception area that is downstream the processing line and configured for directing liquid selectively to the dispensing area and to a or the above waste collector.

The drop stop can have an exit edge or outlet that is movable between a dispensing position directing the liquid to the dispensing area and a collecting position directing the liquid from the drop stop to the waste collector.

The drop stop can have a dispensing exit edge or outlet that is configured to direct the beverage from the drop stop to the dispensing area. The drop stop can have a collection arrangement, such as a collector or a collection exit edge or outlet, that is configured to collect or direct to a collection area residual liquid from the drop stop inlet or reception area so as to prevent dispensing of the liquid to the dispensing area.

Examples of drop stops are disclosed in WO 2006/050769, WO 2012/072758, WO 2013/127907, WO 2016/050657, WO 2016/083488, WO 2018/069266 and EP2017208722.3.

The rotatable and/or translatable device can be a beverage ingredient barrier, such as a gate or door or hatch, for selectively allowing and preventing an ingredient to enter and/or to move along the beverage processing line. The barrier may be configured for controlling an insertion of an ingredient, e.g. supplied within a capsule, from outside the beverage processing line, e.g. from outside such machine, into the beverage processing line via an insertion passage, e.g. into an ingredient mixing unit. For instance, the beverage ingredient barrier is a mechanical ingredient barrier that is displaceable by its corresponding actuation output device, e.g. via a fixed connection or an articulated connection such as a pivoting and/or translating and/or a cam connection, between an ingredient retaining position and an ingredient releasing position.

Details of suitable barriers for an ingredient, such as an ingredient supplied within a capsule, are disclosed in WO 2012/126971, WO 2014/056641, WO 2014/056642 and WO 2015/086371.

The machine can include an ingredient mixing unit having a first part and a second part that are: relatively movable together to form an ingredient mixing chamber in which an ingredient, e.g. supplied within a capsule, can be processed; and relatively movable apart to allow introduction into the mixing chamber and/or removal from the mixing chamber of such ingredient, e.g. within the capsule.

Examples of suitable mixing units with first and second parts that are relatively moved by a motor are disclosed in EP 1767129, WO 2012/025258, WO 2012/025259, WO 2013/127476, WO 2014/056641, WO 2014/096122, WO 2014/096123, WO 2015/155144 and WO 2015/155145.

At least one part of the first and second parts may delimit a cavity for receiving the ingredient e.g. within a capsule, such as a tapered cavity, e.g. a conical or pyramidal cavity, or a straight cavity, e.g. a cylindrical or trapezoidal cavity. Such cavity may extend along an axis that is generally collinear with the above longitudinal straight axis.

The other part of these first and second parts may include an extraction plate, such as a plate provided with piercing elements for opening a flow-through face of the capsule or a non-intrusive plate for cooperating with a pre-opened or a self-opening flow-through face of the capsule.

Self-opening capsules are for instance disclosed in CH 605 293 and WO 03/059778.

The opening of capsules by a machine's piercing elements of a plate are for example disclosed in EP 512 470 and EP 2 068 684.

Examples of suitable mixing units with mixing chambers are disclosed in WO 2008/037642 and WO 2013/026843.

A flavoured beverage may be prepared by circulating (by means of a liquid driver, e.g. a pump) a carrier liquid, such as water, into the capsule to flavour the liquid by exposure to a flavouring ingredient held in the capsule, e.g. along an extraction direction that may be generally parallel to the direction of relative movement of the first and second parts of the mixing module.

When closed capsules are used, the first and second parts may include a capsule opener such as blades and/or a tearing tool, e.g. a plate with a tearing profile, for instance as known from Nespresso™ machines or as disclosed in EP 0 512 470, EP 2 068 684 and WO 2014/076041 and the references cited therein.

The machine may have a transfer channel for supplying an ingredient to the mixing unit. The channel may extend to a waste collector, e.g. a removable waste collector.

The interaction between the first and second parts (and optionally the transfer channel) and an ingredient capsule may be of the type disclosed in WO 2005/004683, WO 2007/135135, WO2007/135136, WO 2008/037642 and WO 2013/026856.

The first and second parts of the mixing unit can be relatively moved by a further actuator, such as a motor and/or a user-handle, via a further actuation transmission, e.g. a gear or spur gear and/or cam-follower and cam transmission. The first and second parts may be actuatable separately of any actuation of the actuation distributor. In this case, the actuation of the first and second parts can be of the known type.

The beverage processing line may include a liquid inlet passage, such as a water inlet passage, that is connectable to a liquid source, such as to a supply tank and/or to an external liquid supply line.

The beverage processing line may incorporate a liquid driver, such as a pump e.g. solenoid pump or a diaphragm pump, for driving liquid along the beverage processing line.

The beverage processing line may include a thermal conditioner, such as a heater and/or a cooler, for thermally conditioning liquid circulating along the processing line. For instance, the conditioner is a batch conditioner, such as a boiler, or a flow conditioner, such as a thermoblock or an instant heater.

The thermal conditioner may be a boiler or a thermoblock or an on demand heater (ODH), for instance an ODH type disclosed in EP 1 253 844, EP 1 380 243 and EP 1 809 151.

Examples of pumps and their incorporation into beverage machines are disclosed in WO 2009/150030, WO 2010/108700, WO 2011/107574 and WO 2013/098173.

The beverage processing line can incorporate a or the above ingredient mixing unit having a or the above mixing chamber in which are mixed, to form the beverage, at least two ingredients, such as a carrier liquid and an additive, e.g. water and a flavouring ingredient selected from at least one of coffee, tea, coca, milk, baby food and soup concentrate.

The beverage processing line may include a beverage outlet for dispensing the beverage out of the beverage processing line towards a or the above dispensing area. The area may be delimited by a support for supporting a user-recipient, e.g. a cup or mug. For instance, the beverage is dispensed via a or the above drop stop and/or via a or the above beverage passage of a or the above beverage dispensing head.

The machine typically includes a control unit.

The control unit may have a control circuit, e.g. a control circuit for controlling a or the above liquid driver and/or a or the above thermal conditioner. The control circuit may include a micro-controller and/or a micro-processor.

The control unit can comprise an ingredient sensor such as an ingredient capsule sensor.

Details of suitable capsule sensors are disclosed in WO 2012/123440, WO 2014/147128, WO 2015/173285, WO 2015/173289, WO 2015/173292, WO 2016/005352, WO 2016/005417, PCT/EP18/065613, EP3275345 and EP3275346.

The control unit may incorporate a user-interface, such as a user-interface connected to a or the above control circuit. The user-interface may be of the known type, e.g. as disclosed in WO 2010/037806, WO 2011/020779, WO 2016/083485, WO 2017/037215 and PCT/EP18/064138.

The control unit can have a sensor for sensing a presence of a user-recipient, e.g. a cup or mug, in a or the above area to which beverage from the beverage processing line is dispensed. Such a configuration is for instance disclosed in WO 2018/046400.

The machine may have an outside side of a or the above stationary main machine housing and/or stationary main machine frame that delimits a or the above dispensing area. The area may be delimited by a support for supporting a user-recipient, e.g. a cup or mug. For instance, the support is a support device that is connected to the stationary main machine housing and/or stationary main machine frame or is formed by a support device that is external to such machine and on which such machine is placed for preparing and dispensing the beverage. Typically, the external support device has a generally horizontal surface for placing such machine, the device being for instance a table or a shelf.

The user-recipient support can be: associated with a drip tray e.g. a drip tray supporting the support; and/or movable relative to the housing vertically under the outlet and/or away from under the outlet for enabling a placement of user-recipients of different heights under the outlet.

Examples of suitable recipient supports are disclosed in EP 0 549 887, EP 1 440 639, EP 1 731 065, EP 1 867 260, U.S. Pat. Nos. 5,161,455, 5,353,692, WO 2009/074557, WO 2009/074559, WO 2009/135869, WO 2011/154492, WO 2012/007313, WO 2013/186339, EP 2014198710, EP 2014198712 and EP 2014198715.

The machine can have a waste collector for collecting waste material from the beverage processing line. The waste receptacle may be configured in the machine for collecting: used ingredient, e.g. used ingredient capsules, removed from a or the above mixing chamber upon beverage processing; and/or liquid residues from a or the above mixing chamber and/or from a or the above beverage outlet via a or the above drop stop.

Examples of suitable waste collectors for carrying out the present invention are disclosed in EP 1867260, WO 2009/074559, WO 2009/135869, WO 2010/128109, WO 2011/086087, WO 2011/086088, WO 2017/118713, WO 2017/148965 and EP 2018156589.

BRIEF DESCRIPTION OF THE DRAWINGS

The invention will now be described with reference to the schematic drawings, wherein.

DETAILED DESCRIPTION

Figure 1:
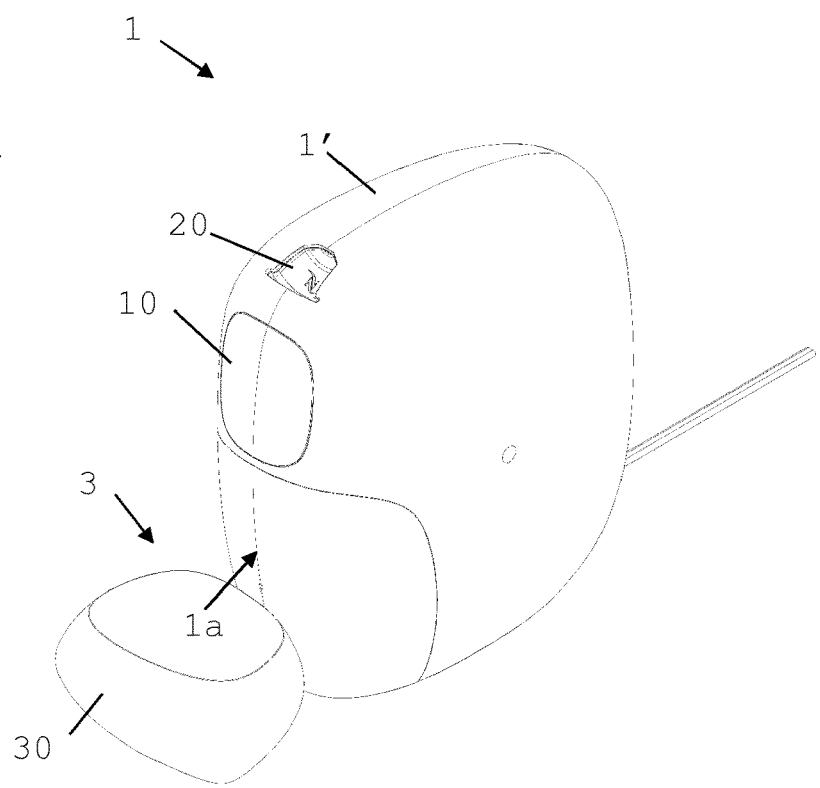
FIG. 1 is a perspective view form above of a machine according to the invention having a beverage dispensing head in a rest position.
Figure 2:
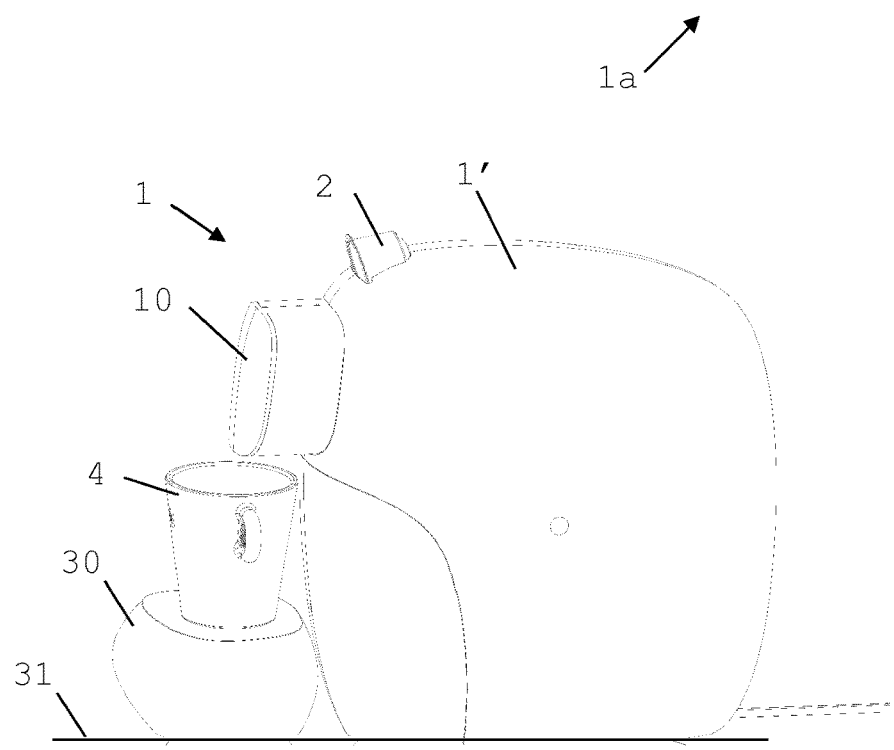
FIG. 2 is a side view of the machine of FIG. 1 in a configuration in which the beverage dispensing head is in position for dispensing beverage over a dispensing area into a user-recipient.
Figure 3:
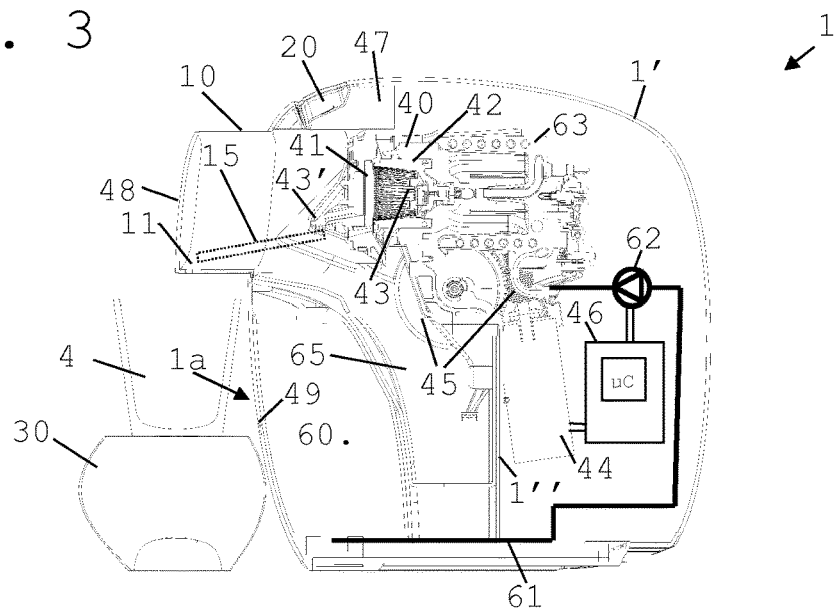
FIG. 3 is a cross-sectional view of the machine as shown in FIG. 2.
Figure 4:
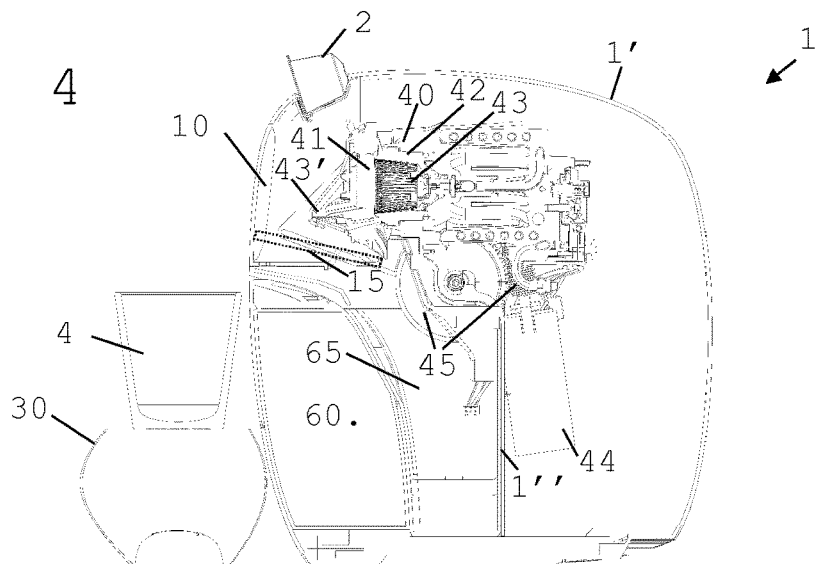
FIG. 4 is a cross-sectional view of the machine as shown in FIG. 1.
Figure 5:
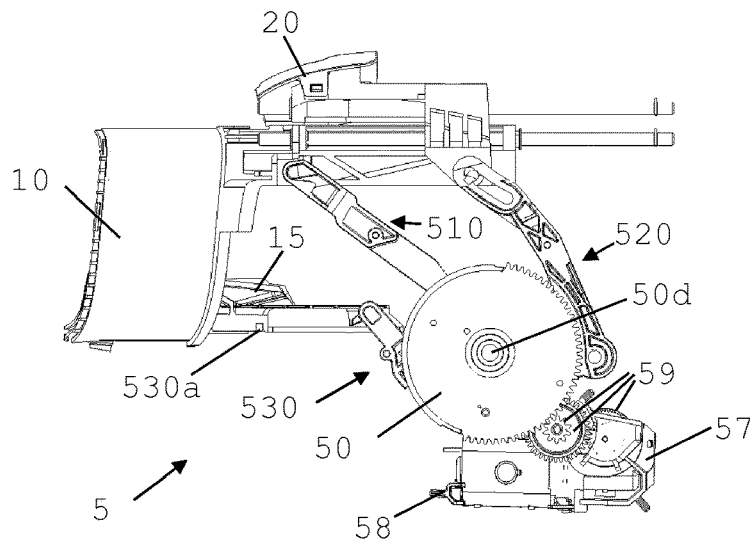
FIG. 5 is a side view of an actuation arrangement having an actuator, an actuation distributor and a plurality of actuation output devices, configured to actuate rotatable and/or translatable devices of the machine of FIGS. 1 to 4, the actuator arrangement (actuator, an actuation distributor and a plurality of actuation output devices) being not illustrated in FIGS. 1 to 4.
Figure 6:
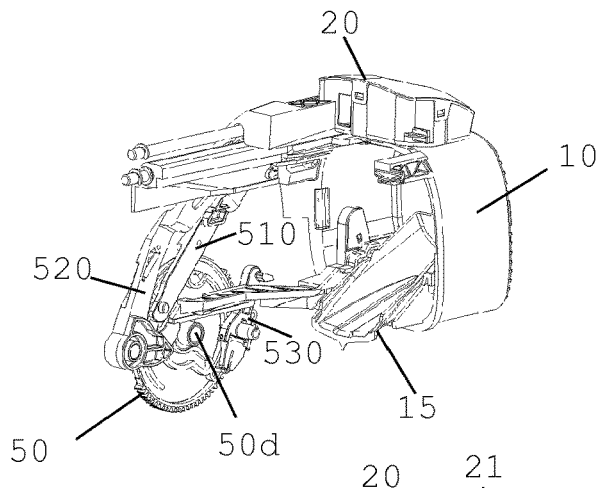
FIGS. 6 to 9 are perspective views of the same actuation arrangement (shown without its actuator) and rotatable and/or translatable devices in different positions.
Figure 7:
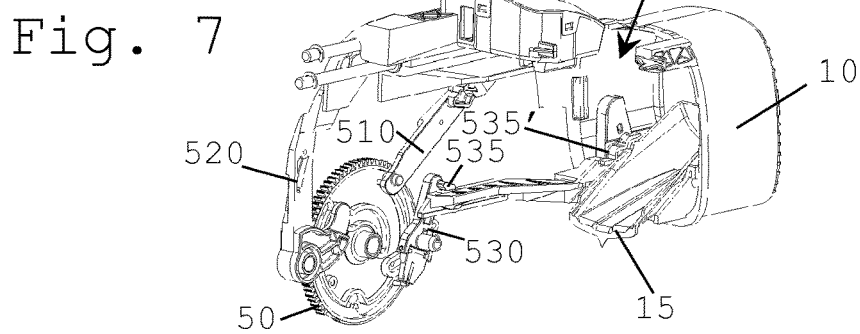
Figure 8:
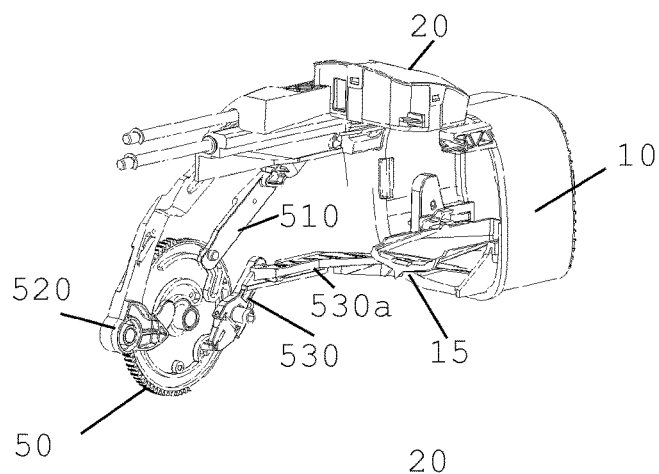
Figure 9:
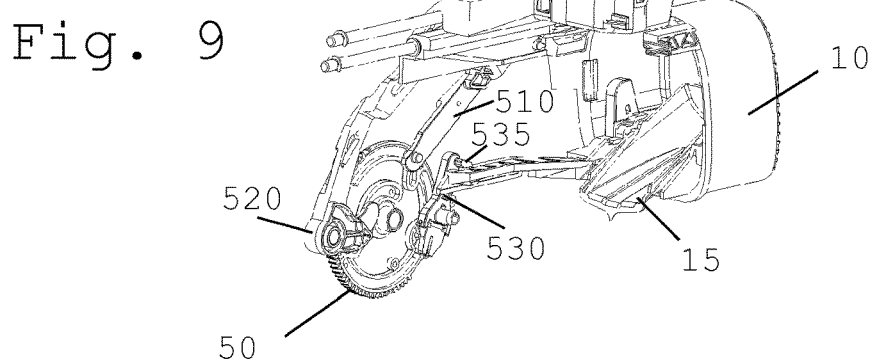
Figure 10:
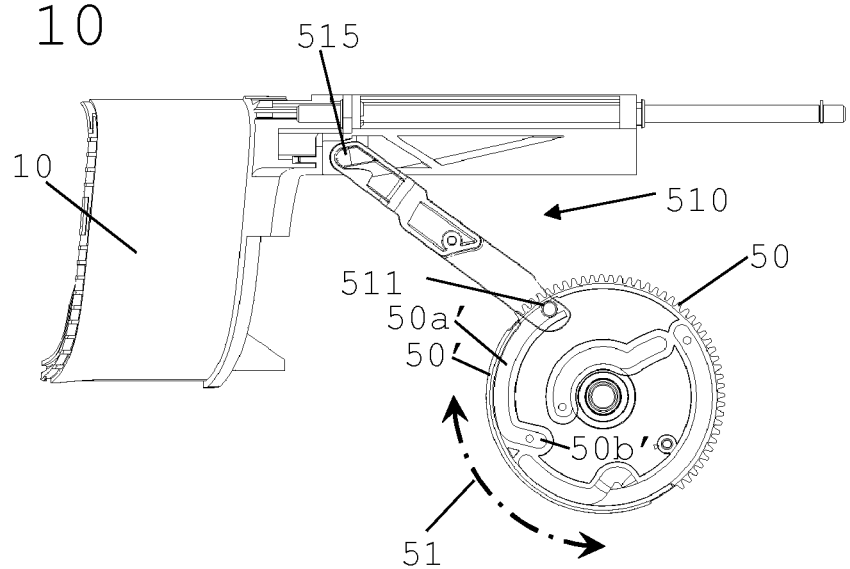
FIGS. 10 to 12 are side views of the machine's actuation distributor and an actuation output device displacing the beverage dispensing head into different positions.

FIGS. 1 to 18 illustrate an exemplary embodiment of a beverage machine 1 for preparing along a beverage processing line 43',61 and dispensing therefrom a beverage, e.g. prepared from a capsule 2 containing an ingredient of the beverage. See FIGS. 1 to 4.

The ingredient may thus be supplied in the form of an ingredient capsule 4, e.g. of the type described above under the header "Field of the Invention".

Machine 1 has an actuation arrangement 5 comprising an actuator 57, such as a motor e.g. an electric motor, and an actuation transmission 50,510,520,530 actuated by actuator 57. See FIGS. 5 to 9.

Actuation transmission 50,510,520,530 comprises: an actuation distributor 50 actuated by actuator 57; a first actuation output device 510 having a first input port 511; and a second actuation output device 520 having a second input port 521. Actuation distributor 50 has a first output port 50' for operating first actuation output device 510 via first input port 511 connected to first output port 50' and a second output port 50" for operating second actuation output device 520 via second input port 521 connected to second output port 50". First actuation output device 510 and second actuation output device 520 are displaced in a non-identical manner via first and second output ports 50',50". Actuation distributor 50 may have a third output port 50''' for operating a third actuation output device 530 having a third input port 531 connected to third output port 50''' such that third actuation output device 530 is displaced via the third input port 531 in a manner that is non-identical to a displacement of first actuation output device 510 and non-identical to a displacement of second actuation output device 520. See FIGS. 5 to 18.

Distributor 50 can be configured so that, when actuator 57 drives actuation distributor 50, at least one of actuation output device 510,520,530 is stationary during a driving passive period and is displaced during a driving active period by the corresponding output port 50',50",50''' of actuation distributor 50 (FIGS. 6 to 9).

Figure 11:
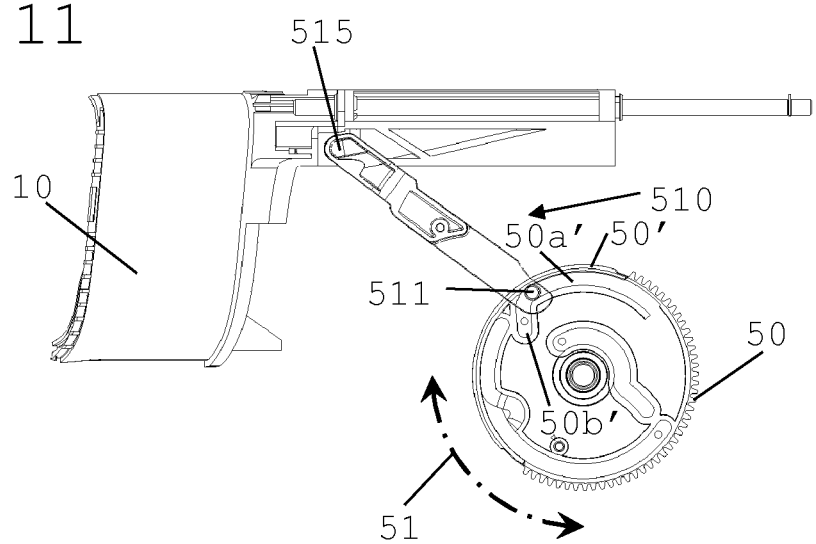
Figure 12:
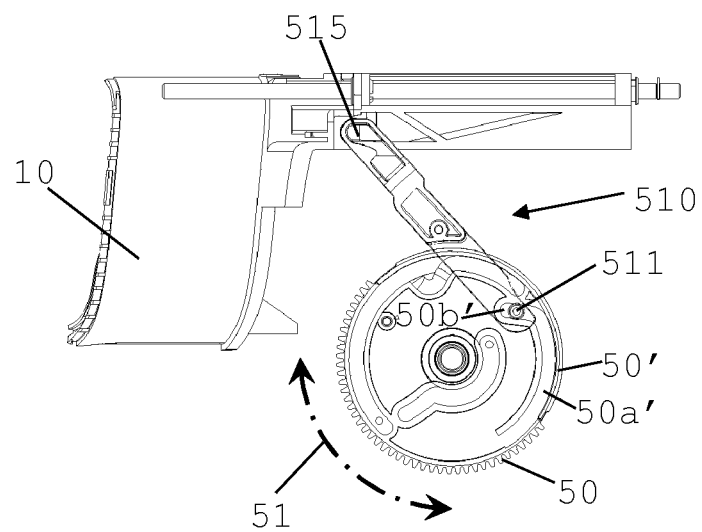
Figure 13:
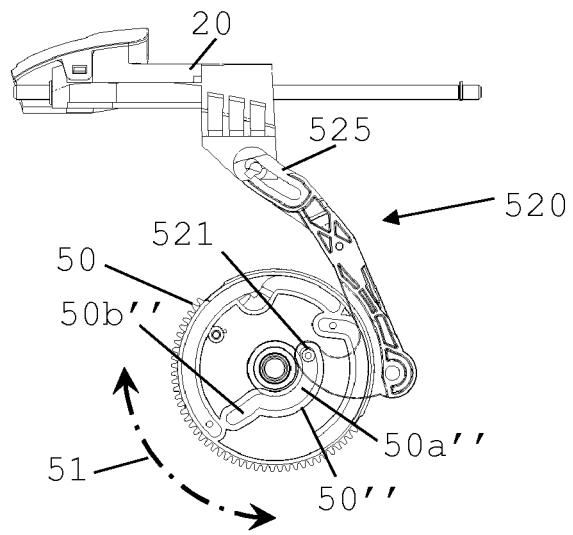
FIGS. 13 to 15 are side views of the machine's actuation distributor and an actuation output device displacing a beverage ingredient barrier into different positions.
Figure 14:
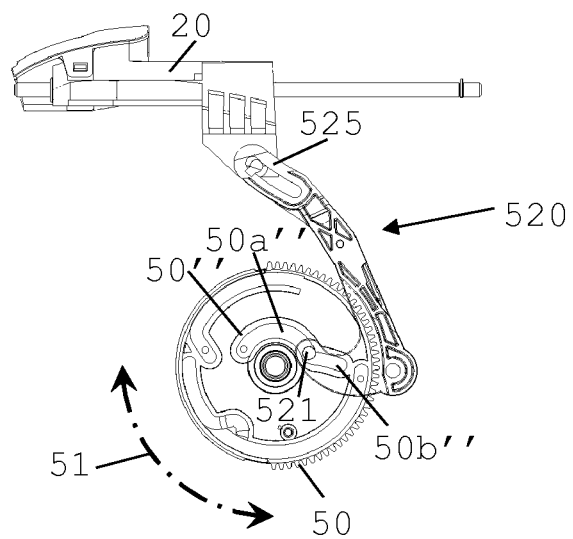
Figure 15:
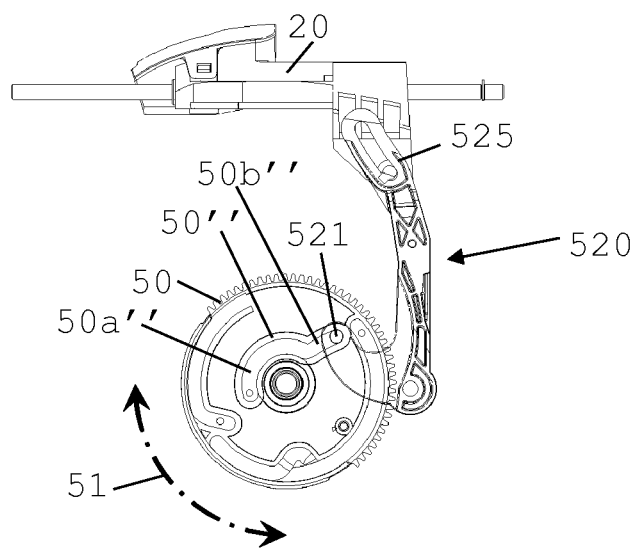
Figure 16:
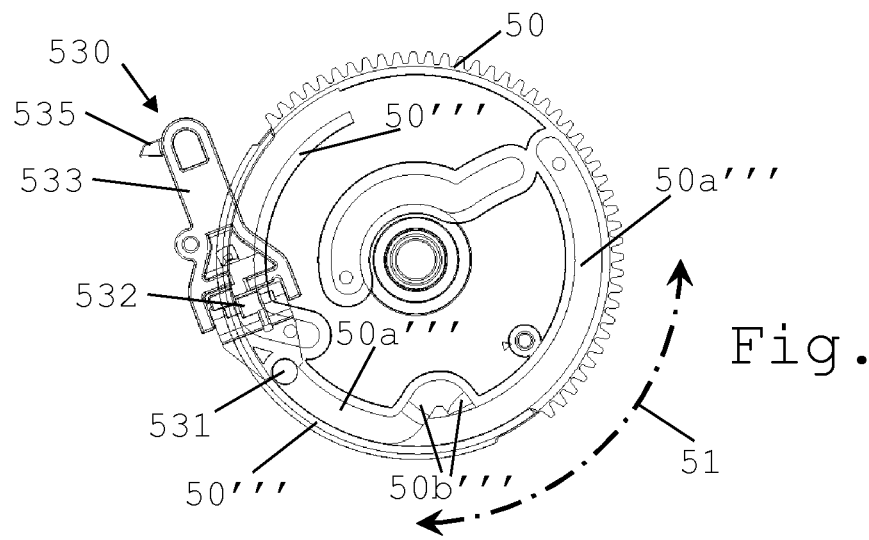
FIGS. 16 to 18 are side views of the machine's actuation distributor and part of an actuation output device for displacing a drop stop into different positions.
Figure 17:
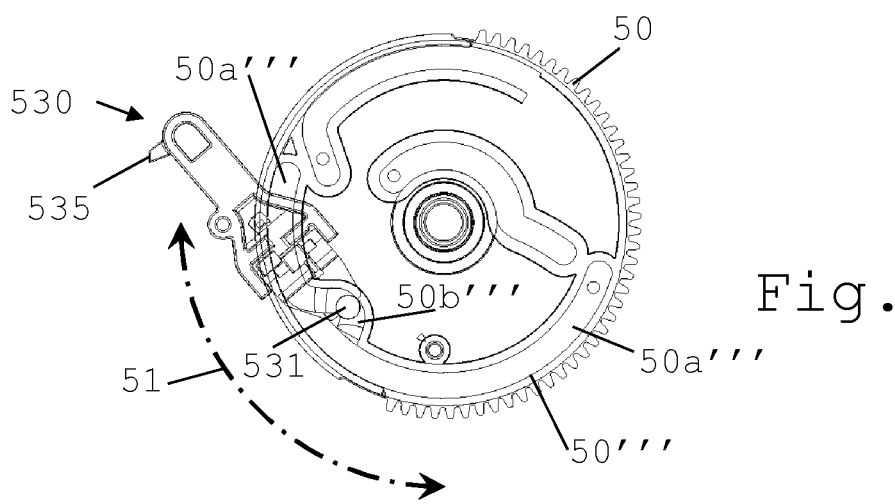
Figure 18:
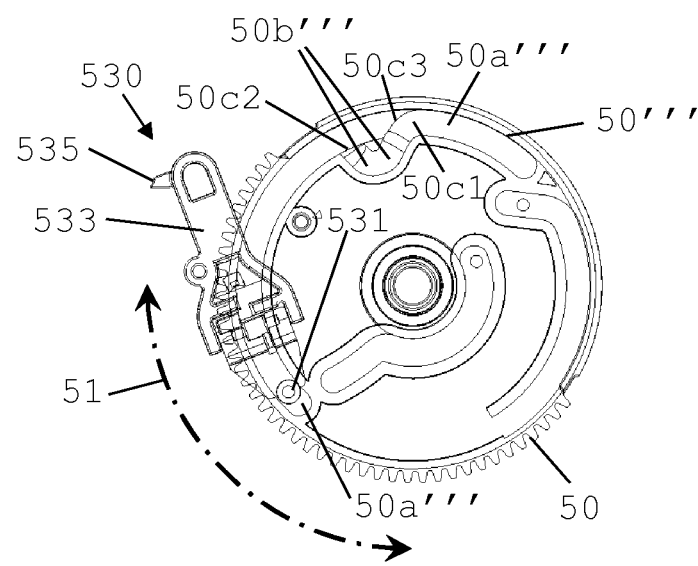

First actuation output device 510 can be associated with a first driving passive period (FIGS. 10 to 11) and a first active period (FIGS. 11 to 12). Second actuation output device 520 can be associated with a second driving passive period (FIGS. 13 to 14) and a second active period (FIGS. 14 to 15). When present, third actuation output device 530 can be associated with a third driving passive period (FIGS. 18 to 16) and third active periods (about FIG. 17). First driving passive and active periods may be non-identical to second driving passive and active periods and, when present, third driving passive and active periods being non-identical to first driving passive and active periods and non-identical to second driving passive and active periods (FIGS. 6 to 9).

At least one output port 50',50",50''' and corresponding input port 511,521,531 may be configured as a cam follower and cam arrangement 50',511;50",521; 50''',531 or as a gear arrangement, such as a toothed gear, e.g. a toothed gear arrangement with gears having a partly toothed transmission track for an engagement on part of the transmission track and for a disengagement on another part of the transmission track between the corresponding output and input ports. For example, at least one output port 50',50",50''' forms a cam and at least one input port 511,521,531 forms a cam-follower. See FIGS. 6 to 18.

At least one output port 50',50",50''' and corresponding input port 511,521,531 may have a cam follower and cam arrangement with a cam 50',50",50''' having a passive portion 50a',50a",50a''' extending along a movement direction 51 of cam 50',50",50''' and an active portion 50b',50b",50b''' extending along a direction that diverges from movement direction 51 of the cam, such as a passive portion extending along a direction that is concentric with a curved movement of cam 50',50",50''' or a passive portion extending along a direction that is parallel to a straight movement of the cam. See FIGS. 10 to 18.

At least one output port 50''' may have an active portion 50b''' that has a first extremity 50c1 and a second extremity 50c2, first and second extremities 50c1,50c2 joining a passive portion 50a''' at spaced apart locations of passive portion 50a'''. For example, active portion 50b''' and passive portion 50a''' are configured such that input port 531 is forced from passive portion 50a''' into active portion 50b''' at first extremity 50c1 and forced to remain on passive portion 50a''' to bypass active portion 50b''' at second extremity 50c2. See FIGS. 16 to 18.

The active portion may be relatively bypassed when the input port relatively moves along the passive portion at the first extremity, the input port entering the active portion at the second extremity.

Active portion 50b''' can be bypassed when input port 531 relatively moves along the passive portion 50a''' at second extremity 50c2, input port 531 entering active portion 50b''' at first extremity 50c1.

Active portion 50b''' and passive portion 50a''' may have one or more of the following configurations to direct input port 531 relatively to active portion 50''' and to passive portion 50a''': active portion 50b''' forms a ramp between the first and second extremities 50c1,50c2; active portion 50b''' delimits a step at first and/or second extremity 50c1 or between the first and the second extremities; passive portion 50a''' delimits a step 50c3 at first and/or the second extremity 50c1,50c2 or between the first and the second extremities; and passive portion 50a''' forms a ramp between first and second extremities 50c1,50c2. See FIGS. 16 to 18.

At least one input port 531 may be biased against corresponding output port 50'''. For instance at least one of actuation output device 530 has a connection member 533 movably connected to corresponding input port 531 that is urged against corresponding output port 50''', e.g. by a spring 532 or resilient part between input port 531 and connection member 533. See FIGS. 16 to 18.

Actuation distributor 50 may be moved in rotation by actuator 57 about a distributor axis 50d and/or can be linearly moved along a straight direction. See FIG. 5.

At least one actuation output device 510,520,530 may be connected, e.g. via a fixed connection or an articulated connection such as a pivoting and/or translating and/or a cam connection 515,525,535, directly or indirectly, e.g. indirectly by an articulated link 530a having an output connector 535' such as a pivoting and/or translating and/or a cam connector 535', to a rotatable and/or translatable device 10,15,20 so as to displace rotatable and/or translatable device 10,15,20 relatively to a stationary main machine housing 1' and/or stationary main machine frame 1" by displacing the corresponding actuation device 510,520,530 when operated by actuation distributor 50. For instance, each output device 510,520,530 is connected directly or indirectly to a corresponding rotatable and/or translatable device 10,15,20 and each rotatable and/or translatable device 10,15,20 is displaced relatively to a stationary main machine housing 1' and/or stationary main machine frame 1" by displacing its corresponding actuation device 510,520, 530 when operated by actuation distributor 50. See FIGS. 5 to 9.

At least one rotatable and/or translatable device 10,15,20 can be a beverage dispensing head 10. Such head 10 may delimit a beverage passage 11 which is displaceable by the head's output device 510, e.g. via a fixed connection or an articulated connection such as a pivoting and/or translating and/or a cam connection 515, over a dispensing area 3, such as an area 3 delimited by a support 30,31 for supporting a user-recipient 4 e.g. a cup or mug. See FIGS. 1 to 12

Beverage dispensing head 10 may be displaceable, for instance in translation, outwards out of stationary main machine housing 1' and/or stationary main machine frame 1" for dispensing a beverage. Beverage dispensing head may be displaceable inwards into stationary main machine housing 1' and/or stationary main machine frame 1" for resting. See FIGS. 1 to 4.

At least one rotatable and/or translatable device 10,15,20 may be a drop stop 15. Drop stop 15 may form a guide for guiding beverage from the beverage processing line 43',61 to a or the above mentioned dispensing area 3, such as an area delimited by a support 30,31 for supporting a user-recipient 4, e.g. a cup or mug, and for guiding liquid residues to a waste collector 65. For instance, drop stop 15 is displaceable by its output device 530, e.g. via a fixed connection or an articulated connection such as a pivoting and/or translating and/or a cam connection 535 and/or via an articulated link 530a having a connector 535' such as a pivoting and/or translating and/or a cam connector 535', for example in translation and rotation, relative to the stationary main machine housing 1' and/or stationary main machine frame 1" between a position for dispensing beverage to the dispensing area 3 and a position for preventing the dispensing of such beverage to dispensing area 3. See FIGS. 3 to 9 and 16 to 18.

At least one rotatable and/or translatable device 10,15,20 can be a beverage ingredient barrier 20, such as a gate or door or hatch, for selectively allowing and preventing an ingredient 2 to enter and/or to move along beverage processing line 43',61. Barrier 20 may be configured for controlling an insertion of an ingredient, e.g. supplied within a capsule 2, from outside beverage processing line 43',61, e.g. from outside such machine 1, into beverage processing line 43'61 via an insertion passage 21, e.g. into an ingredient mixing unit 40. For instance, beverage ingredient barrier 20 is a mechanical ingredient barrier 20 that is displaceable by its output device 520, e.g. via a fixed connection or an articulated connection such as a pivoting and/or translating and/or a cam connection 525, between an ingredient retaining position and an ingredient releasing position. See FIGS. 1 to 9 and 13 to 15.

Machine 1 may include an ingredient mixing unit 40 having a first part 41 and a second part 42 that are relatively movable together to form an ingredient mixing chamber 43 in which an ingredient, e.g. supplied within a capsule 2, can be processed. First and second parts 41,42 may be relatively movable apart to allow introduction into mixing chamber 43 and/or removal from mixing chamber 43 of the ingredient, e.g. supplied within capsule 2. See FIGS. 1 to 4.

First and second parts 41,42 of mixing unit 40 can be relatively moved by a further actuator 44, such as a motor and/or a user-handle, via a further actuation transmission 45 e.g. a gear or spur gear and/or cam-follower and cam transmission. First and second parts 41,42 may be actuatable separately of any actuation of the actuation distributor 50. See FIGS. 3 and 4.

Beverage processing line 43',61 may include a liquid inlet passage 61, such as a water inlet passage, that is connectable to a liquid source, such as to a supply tank 60 and/or to an external liquid supply line.

Beverage processing line 43',61 may have a liquid driver 62, such as a pump e.g. solenoid pump or a diaphragm pump, for driving liquid along beverage processing line 43',61.

Beverage processing line 43',61 can include a thermal conditioner 63, such as a heater and/or a cooler, for thermally conditioning liquid circulating along processing line 43',61. For instance, conditioner 63 is a batch conditioner, such as a boiler, or a flow conditioner, such as a thermoblock or an instant heater.

Beverage processing line 43',61 can incorporate a or the above mentioned ingredient mixing unit 40 having a or the above mentioned mixing chamber 43 in which are mixed to form the beverage at least two ingredients, for instance a carrier liquid and an additive 2, such as water and a flavouring ingredient selected from at least one of coffee, tea, coca, milk, baby food and soup concentrate.

Beverage processing line 43',61 may comprise a beverage outlet 43' for dispensing the beverage out of the beverage processing line 43',61 towards a or the above mentioned dispensing area 3. Area 3 may be delimited by a support 30,31 for supporting a user-recipient 4 e.g. a cup or mug. Beverage may be dispensed out of beverage outlet 43' to area 3 via a or the above mentioned drop stop 15 and/or via a or the above mentioned beverage passage 11 of a or the above mentioned beverage dispensing head 10.

Machine 1 typically has a control unit 46,47,48,49. The control unit may include at least one of: a control circuit 46, e.g. a control circuit for controlling a or the above mentioned liquid driver 62 and/or a or the above mentioned thermal conditioner 63; an ingredient sensor 47 such as an ingredient capsule sensor; a user-interface 48, such as a user-interface 48 connected to a or the above mentioned control circuit 46; a sensor 49 for sensing a presence of a user-recipient 4, e.g. a cup or mug, in a or the above mentioned area 3 to which beverage from beverage processing line 43',61 is dispensed. See FIG. 3.

Machine 1 can have an outside side 1a of a or the above mentioned stationary main machine housing 1' and/or stationary main machine frame 1" that delimits a or the above mentioned dispensing area 3. The area may be delimited by a support 30,31 for supporting a user-recipient 4, e.g. a cup or mug. The support can be a support device 30 that is connected to stationary main machine housing 1' and/or stationary main machine frame 1" or can be formed by a support device 31 that is external to such machine 1 and on which such machine 1 is placed for preparing and dispensing beverage. The latter support 31 can be an external support device 31 having a generally horizontal surface for placing such machine 1, for example a table or a shelf. See FIG. 2.

Machine 1 may have a waste collector 65 for collecting waste material from beverage processing line 43',61. Collector 65 may be configured as a waste receptacle for collecting: used ingredient, e.g. used ingredient capsules 2, removed from a or the above mentioned mixing chamber 43 upon beverage processing; and/or liquid residues from a or the above mentioned mixing chamber 43 and/or from a or the above mentioned beverage outlet 43' via a or the above mentioned drop stop 15. See in particular FIGS. 3 and 4.

The invention claimed is:

1. A machine for preparing, along a beverage processing line and dispensing therefrom, a beverage, the machine comprising:
an actuation arrangement having an actuator and an actuation transmission actuated by the actuator, wherein the actuation transmission comprises:
an actuation distributor actuated by the actuator,
a first actuation output device having a first input port, and
a second actuation output device having a second input port, the actuation distributor having:
a first output port for operating the first actuation output device via the first input port connected to the first output port, and
a second output port for operating the second actuation output device via the second input port connected to the second output port, such that the first actuation output device and the second actuation output device are displaced in a non-identical manner via the first and second output ports; and
an ingredient mixing unit having a first part and a second part, relatively moved by a further actuator, such that the first part and the second part are relatively moveable (i) together to form an ingredient mixing chamber in which an ingredient can be processed and (ii) apart to allow at least one of introduction into the mixing chamber and removal from the mixing chamber of the ingredient.

2. The machine of claim 1, wherein the distributor is configured so that, when the actuator drives the actuation distributor, at least one of the first and second actuation output devices is stationary during a driving passive period and is displaced during a driving active period by the corresponding output port of the actuation distributor.

3. The machine of claim 1, wherein at least one of the first and second output ports and its corresponding input port are configured as (i) a cam follower and cam arrangement or (ii) as a gear arrangement.

4. The machine of claim 3, wherein at least one of the first and second output ports and its corresponding input port has:
a cam follower and cam arrangement with a cam having a passive portion extending along a movement direction of the cam, and
an active portion extending along a direction that diverges from the movement direction of the cam that is parallel to a straight movement of the cam.

5. The machine of claim 4, wherein at least one of the first and second output ports has an active portion that has a first extremity and a second extremity, the first and second extremities joining a passive portion at spaced apart locations of the passive portion.

6. The machine of claim 5, wherein the active portion is configured for one of:
relatively bypassed when the corresponding input port relatively moves along the passive portion at the first extremity, the corresponding input port entering the active portion at the second extremity, or bypassed when the corresponding input port relatively moves along the passive portion at the second extremity, the corresponding input port entering the active portion at the first extremity.

7. The machine of claim 5, wherein the active portion and the passive portion have one or more of the following configurations to direct the corresponding input port relatively to the active portion and to the passive portion:
the active portion forms a ramp between the first and second extremities;
the active portion delimits a step at the first and/or second extremity or between the first and the second extremities;
the passive portion delimits a step at the first and/or the second extremity or between the first and the second extremities; and
the passive portion forms a ramp between the first and second extremities.

8. The machine of claim 1, wherein at least one of the first and second input ports is biased against the corresponding output port.

9. The machine of claim 1, wherein the actuation distributor is moved in rotation by the actuator about a distributor axis and/or is linearly moved along a straight direction.

10. The machine of claim 1, wherein at least one actuation output device is connected to a rotatable and/or translatable device so as to displace the rotatable and/or translatable device relatively to a stationary main machine housing and/or stationary main machine frame by displacing the corresponding actuation device when operated by the actuation distributor.

11. The machine of claim 10, wherein at least one rotatable and/or translatable device is selected from:
a beverage dispensing head;
a drop stop; and
a beverage ingredient barrier.

12. The machine of claim 1, wherein the beverage processing line comprises at least one of:
a liquid inlet passage that is connectable to a liquid source;
a liquid driver for driving liquid along the beverage processing line;
a thermal conditioner for thermally conditioning liquid circulating along the processing line;
an ingredient mixing unit having a mixing chamber in which are mixed to form the beverage at least two ingredients; and
a beverage outlet for dispensing the beverage out of the beverage processing line towards the dispensing area.

13. The machine of claim 1, which comprises:
a control unit;
an outside side of the stationary main machine housing and/or stationary main machine frame that delimits the dispensing area; and
a waste collector for collecting waste material from the beverage processing line.

14. The machine of claim 12, wherein the liquid source is at least one of a supply tank and an external liquid supply line.

15. The machine of claim 12, wherein the thermal conditioner is a batch conditioner.

16. The machine of claim 12, wherein the at least two ingredients include a carrier liquid and an additive.

17. The machine of claim 1, wherein the first part and the second part of the ingredient mixing unit are configured to be actuated and moved separately.

18. The machine of claim 17, wherein the first part and the second part are actuatable separately from any actuation of the actuation distributor.

\* \* \* \* \*